United States Patent
Zhan et al.

(10) Patent No.: US 9,596,378 B2
(45) Date of Patent: *Mar. 14, 2017

(54) METHOD AND APPARATUS FOR AUTHENTICATING PRINTED DOCUMENTS THAT CONTAINS BOTH DARK AND HALFTONE TEXT

(71) Applicant: KONICA MINOLTA LABORATORY U.S.A., INC., San Mateo, CA (US)

(72) Inventors: Xiaonong Zhan, Foster City, CA (US); Wei Ming, Cupertino, CA (US); Songyang Yu, Milpitas, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,623

(22) Filed: Mar. 16, 2016

(65) Prior Publication Data

US 2016/0198065 A1    Jul. 7, 2016

Related U.S. Application Data

(63) Continuation of application No. 13/223,298, filed on Aug. 31, 2011, now Pat. No. 9,319,556.

(51) Int. Cl.
*G06K 9/00* (2006.01)
*G06K 9/34* (2006.01)
(Continued)

(52) U.S. Cl.
CPC ......... *H04N 1/403* (2013.01); *H04N 1/32101* (2013.01); *H04N 1/4446* (2013.01);
(Continued)

(58) Field of Classification Search
CPC .. H04N 1/32101; H04N 1/403; H04N 1/4446; H04N 2201/3226;
(Continued)

(56) References Cited

U.S. PATENT DOCUMENTS 3,905,018 A    9/1975 Gray
4,701,807 A    10/1987 Ogino
(Continued)

FOREIGN PATENT DOCUMENTS

JP    H06-231306    8/1994
JP    2005-326971    11/2005

OTHER PUBLICATIONS

Otsu, "A Threshold Selection Method from Gray-Level Histograms," IEEE Transactions on Systems, Man, and Cybernetics, vol. 9, No. 1, 1979, pp. 62-66.

(Continued)

*Primary Examiner* — Tammy Paige Goddard
*Assistant Examiner* — Frantz Bataille
(74) *Attorney, Agent, or Firm* — Chen Yoshimura LLP

(57) ABSTRACT

A document authentication method determines the authenticity of a target hardcopy document, which purports to be a true copy of an original hardcopy document. The method compares a binarized image of the target document with a binarized image of the original document which has been stored in a storage device. The image of the original document is generated by binarizing a scanned grayscale image of the original document. Halftone and non-halftone text areas in the grayscale image area separated, and the two types of text are separately binarized. The non-halftone text areas are then down-sampled. During authenticating, a scanned grayscale image of the target document is binarized by separating halftone and non-halftone text areas and binarizing them separately, and then down-sampling the non-halftone text areas. The binarized images of the target document and the original document are compared to determine the authenticity of the target document.

16 Claims, 4 Drawing Sheets

(51) Int. Cl.

| | | |
|---|---|---|
| *H04N 1/40* | (2006.01) | |
| *G06F 3/12* | (2006.01) | |
| *G06K 15/00* | (2006.01) | |
| *H04N 1/403* | (2006.01) | |
| *H04N 1/44* | (2006.01) | |
| *H04N 1/32* | (2006.01) | |

(52) U.S. Cl.
CPC ........... *H04N 2201/3226* (2013.01); *H04N 2201/3235* (2013.01); *H04N 2201/3269* (2013.01); *H04N 2201/3271* (2013.01)

(58) Field of Classification Search
CPC ... H04N 2201/3235; H04N 2201/3269; H04N 2201/3271; G06K 9/34
See application file for complete search history.

(56) References Cited

U.S. PATENT DOCUMENTS

| | | | |
|---|---|---|---|
| 5,131,049 A * | 7/1992 | Bloomberg | G06K 9/346 382/173 |
| 5,355,437 A | 10/1994 | Takatori et al. | |
| 5,452,107 A * | 9/1995 | Koike | G06K 9/38 358/3.01 |
| 5,835,638 A | 11/1998 | Rucklidge et al. | |
| 5,974,195 A | 10/1999 | Kawazome et al. | |
| 6,266,154 B1 | 7/2001 | Allen | |
| 6,687,401 B2 | 2/2004 | Naoi et al. | |
| 6,750,984 B1 | 6/2004 | Kanata et al. | |
| 6,804,395 B1 | 10/2004 | Yoshida | |
| 7,965,894 B2 | 6/2011 | Tian et al. | |
| 3,000,528 A1 | 8/2011 | Ming et al. | |
| 2002/0044689 A1 | 4/2002 | Roustaei et al. | |
| 2003/0113016 A1 | 6/2003 | Naoi et al. | |
| 2004/0114185 A1 | 6/2004 | Shiau et al. | |
| 2004/0264781 A1 | 12/2004 | Eschbach et al. | |
| 2006/0002617 A1 | 1/2006 | Dolan et al. | |
| 2006/0165285 A1 | 7/2006 | Adachi | |
| 2006/0291732 A1 | 12/2006 | Bai et al. | |
| 2007/0047805 A1 | 3/2007 | Ohtsu | |
| 2008/0226171 A1 | 9/2008 | Yin et al. | |
| 2009/0067709 A1 | 3/2009 | Gross et al. | |
| 2012/0093412 A1 | 4/2012 | Dauw et al. | |
| 2012/0120453 A1 | 5/2012 | Yu et al. | |

OTHER PUBLICATIONS

Rosenfield et al., "Thresholding using Relaxation", IEEE Transactions on Pattern Analysis and Machine Intelligence, vol. 3, No. 5, 1981, pp. 598-606.

Shapiro et al., "An Adaptive Method for Image Thresholding", Proceedings of the 11th IAPR International Conference on Pattern Recognition, 1992, pp. 696-699.

Niblack, "An introduction to Image Processing", Prentice-Hall, Englewood Cliffs, 1986, pp. 115-116.

Sauvola et al., "Adaptive document image binarization", Pattern Recognition, vol. 33, 2000, pp. 225-236.

Kim et al., "Document image binarization based on topographic analysis using a water flow model", Pattern Recognition vol. 35, 2002, pp. 265-277.

Pratt, "Digital Image Processing", Fourth Edition, John Wiley & Sons, Inc., 2007, pp. 624.

Fisher et al., "A Rule-Based System for Document Image Segmentation", Jun. 1990, Pattern Recognition Proceedings, 10th International Conference, vol. 1, pp. 567-572.

U.S. Office Action, dated Sep. 20, 2013, in related U.S. Appl. No. 12/946,801.

U.S. Office Action, dated Apr. 11, 2014, in related U.S. Appl. No. 12/946,801.

Japanese Office Action, dated May 20, 2014, in related Japanese patent application, No. JP 2011-206636.

* cited by examiner

METHOD AND APPARATUS FOR AUTHENTICATING PRINTED DOCUMENTS THAT CONTAINS BOTH DARK AND HALFTONE TEXT

BACKGROUND OF THE INVENTION

Field of the Invention

This invention relates to a method for authenticating a copied document by comparing a scanned image of the copied document with a scanned image of the original hardcopy document. In particular, it relates to a method for authenticating a copied document that contains both dark and halftone text.

Description of Related Art

In situations where a hardcopy document (referred to as the original document in this disclosure) is copied, e.g. by using a photocopier, and the copy is distributed and circulated, there is often a need to determine whether a purported true copy (referred to as the target document in this disclosure) is authentic, i.e., whether the copied document has been altered while it was in circulation. A goal in many document authentication methods is to detect what the alterations (additions, deletions) are. Alternatively, some document authentication methods determine whether or not the document has been altered, without determining what the alterations are.

Various types of document authentication methods are known. One type of document authentication method performs a digital image comparison of a scanned image of the target document with an image of the original document. In such a method, a digital image of the original document is stored in a storage device when the copy is made. Later, the target document is scanned, and the stored image of the original document is retrieved from the storage device to compare with the image of the target document. In addition, certain data representing or relating to the original document, such as a document ID, is also stored in the storage device. The same data is encoded in barcodes which are printed on the copied document when the copy is made, and can be used to assist in document authentication.

With the desire for high quality text and pictures, printed documents are typically scanned at a high resolution, for example, often at 600 dpi (dots per inch) or higher. Thus, document authentication by image comparison can be computationally intensive.

In a printed hardcopy document, gray or light color text or image is often printed using a halftone method. For example, a printed gray area will contain a plurality of black dots of ink or toner, the sizes and/or density of the dots being dependent on the gray-scale value of the gray area. Similarly, light colored areas are printed by printing halftone patterns of color saturated dots. In this disclosure, text printed by a halftone method is referred to as halftone text. Image comparison for documents containing both non-halftone (also referred to as dark or black) text and halftone text may present additional challenge.

SUMMARY

The present invention is directed to an improved method for authenticating a copied document that contains both non-halftone text and halftone text.

An object of the present invention is to provide a document authentication method with improved performance.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a document authentication method implemented in a data processing system, which includes: (a) obtaining an original grayscale image representing a hardcopy original document; (b) separating halftone text areas and non-halftone text areas in the original grayscale image; (c) separately binarizing the halftone text areas and the non-halftone text areas generated by step (b); (d) down-sampling the binarized non-halftone text areas generated by step (c), whereby a binarized original image is generated; (e) obtaining a target grayscale image representing a hardcopy target document; (f) separating halftone text areas and non-halftone text areas in the target grayscale image; (g) separately binarizing the halftone text areas and the non-halftone text areas generated by step (f); (h) down-sampling the binarized non-halftone text areas generated by step (g), whereby a binarized target image is generated; and (i) comparing the binarized target image with the binarized original image to determine whether the target document is an authentic copy of the original document.

In another aspect, the present invention provides a computer program product comprising a computer usable non-transitory medium (e.g. memory or storage device) having a computer readable program code embedded therein that causes a data processing apparatus to perform the above method or parts thereof.

It is to be understood that both the foregoing general description and the following detailed description are exemplary and explanatory and are intended to provide further explanation of the invention as claimed.

BRIEF DESCRIPTION OF THE DRAWINGS

FIG. 1 illustrates a document registration stage and FIG. 2 illustrates an authentication stage of the method.

DETAILED DESCRIPTION OF PREFERRED EMBODIMENTS

Embodiments of the present invention provide a document authentication method based on digital image comparison. In particular, the method is suited for authenticating copied documents that contains both non-halftone text and halftone text.

Figure 5:
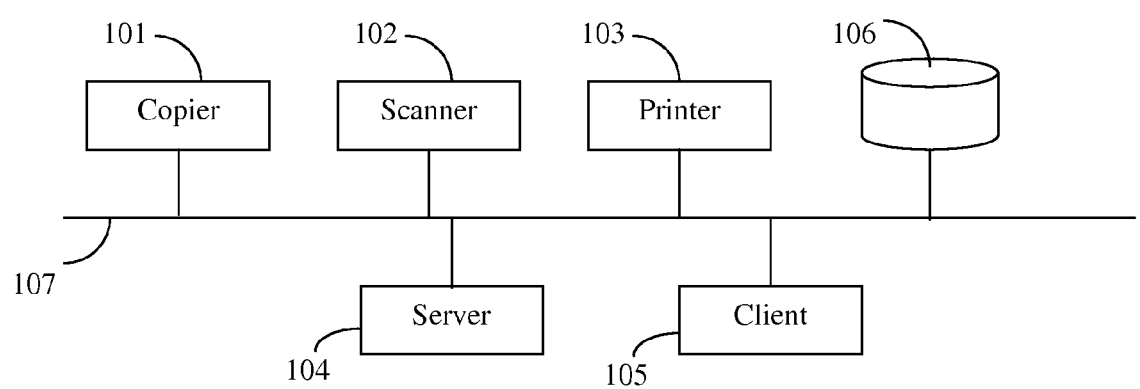
FIG. 5 illustrates a system in which embodiments of the present invention may be implemented.

FIG. 5 illustrates a system that may be used to implement the document authentication method according to embodiments of the present invention. The system includes one or more copiers 101, scanners 102, printers 103, servers 104, mass storage devices 106, etc. It may also include other components such as one or more client computers 105, etc. The copiers, scanners, or printers may be all-in-one devices, i.e., devices that combine a printing section and scanning section in a single device and can perform scanning, printing, and copying functions. Each of the copiers 101, scanners 102, printers 103, servers 104, clients 105 etc. may include a processor with associated memories which can carry out data processing functions by executing programs stored in the memory (these devices or a collection of them may be more generally referred to as data processing apparatus or system). These components are connected to each other by a network 107 and may be located at distributed locations. The copier 101 may be used to make a hardcopy of an original hardcopy document, the printer 103 may be used to print a hardcopy of an original electronic document, and the scanner 102 or the copier 101 may be used to scan a copied document (target document), as will be described later. Various parts of the authentication method may be carried out by the server 104, the copier 101, the scanner 102, or the client 105, etc.

The authentication method according to embodiments of the present invention includes a document registration stage and an authentication stage. In the document registration stage, a copier makes a hardcopy (i.e. on a physical medium such a paper) copy of an original document. The original document may be a hardcopy form or an electronic form. The copy may be made by scanning the original hardcopy document and then printing a copy from the scanned image, or printing the electronic original document. An original document image, which is either the scanned image of the hardcopy original document generated by the copier or an image generated directly from the electronic original document, is processed by a data processing apparatus and the resulting data is stored in the storage device 106 (i.e. the original document is registered in the system for later use). Details of the document registration stage will be described with reference to FIG. 1. Later, a user may submit a copied document (the target document) for authentication by scanning the target document using a scanner 102 or copier 101, and causing a data processing apparatus to retrieve the stored data from the storage device 106 and to perform image comparison. Details of the authentication stage will be described with reference to FIG. 2.

Figures 1, 2:
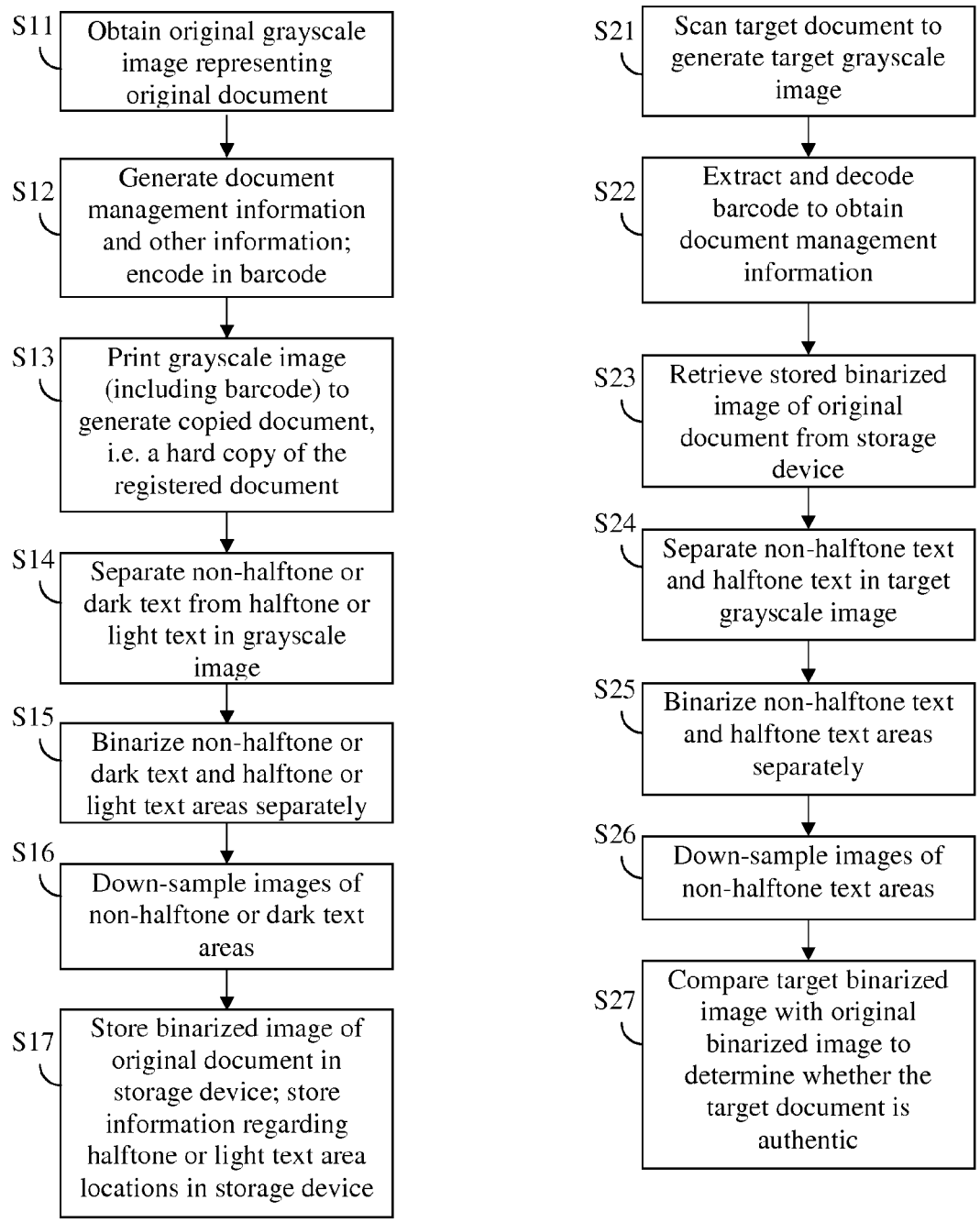
FIGS. 1 and 2 schematically illustrate a document authentication method according to an embodiment of the present invention.

Referring to FIG. 1, in the document registration stage, an original grayscale image representing the original document is obtained (step S11). If the original document is in a hardcopy form, step S11 involves scanning the hardcopy to generate an original grayscale image; if the original document is in an electronic form, step S11 involves generating a grayscale image from the electronic original document if it is not already in an image format. The original grayscale image is printed to generate a copied document, i.e. a hard copy of the original document (step S13).

Note that when the original document is a hardcopy containing halftone text, then both the scanned grayscale image and the copied hardcopy document will contain similar halftone text. If the original document is in an electronic format and contains grey or light colored text, the printed hardcopy document will contain halftone text, while the original image (grayscale image directly generated from the electronic original document) will contain gray or light colored text with no halftone effect.

In addition, document management information, such as document ID, is generated and encoded in barcode (step S12), which is also printed on the copied document in step S13. The document ID will aid in retrieval of the stored document during the authentication stage. Optionally, other document management information may also be encoded in the bar code, such as time of creation of the copy, identity of the user who created the copy, etc., but this is not critical because such information can be stored in the storage device along with the image if desired.

The original grayscale image is processed in steps S14 to S17. More specifically, in the case the original document was a hardcopy, halftone text and non-halftone text in the grayscale image are separated, and in the case the original document was electronic, gray or light colored text (collectively referred to as light text for convenience) is separated from black or dark text (collectively referred to as dark text for convenience) (step S14). Different types of text are binarized separately (step S15).

Separating light text from dark text is straightforward and can be easily implemented by those skilled in the art. The description below focuses on separating halftone text from non-halftone text.

As is generally known, when a hardcopy document containing halftone text is scanned at a sufficiently high resolution, in particular, when the pixel size of the scan is substantially smaller than the halftone dots, the halftone dots are typically visible in the scanned image. Exemplary grayscale images of non-halftone and halftone text are shown in FIGS. 3(*a*) and 3(*b*). FIG. 3(*b*) is an enlarged view illustrating a scanned image of text when the text was printed as a halftone gray color. In this illustration, the halftone dots are clearly visible, and the scanned pixels in the halftone text have various grayscale pixel values. Pixels located within a halftone dot tend to have darker gray pixel values, and pixels located in areas between adjacent halftone dots tend to have lighter gray or white pixel values. The varying gray pixel values arise from the limited sensitivity or accuracy of the scanner used to scan the document. As a comparison, FIG. 3(*a*) is an enlarged view illustrating a scanned image of text when the text in the document was printed as non-halftone (black or dark) text. There are no visible halftone dots. Further, the pixel values within the text area are a black value or close to a black value. Although black and gray text is used in these examples, the same effects exist in color images, where the text may be printed as color saturated text (similar to black text) or light colored text (similar to light gray text, using a halftone method). The descriptions below use black as an example, but the method described herein is applicable to colored text as well.

When a printed document contains both non-halftone text and halftone text, conventional binarization methods often lead to unsatisfactory results for binarizing the halftone text. In embodiments of the present invention, the document is separated into non-halftone text and halftone text (step S14), and the two types of text are binarized separately (step S15). Any suitable methods may be used to perform these two steps; the method described below is disclosed in commonly owned, co-pending U.S. patent application Ser. No. 12/946, 801, filed Nov. 15, 2010.

Figure 4A:
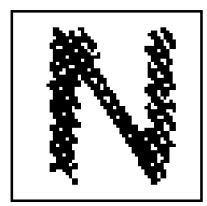
FIG. 4 illustrates a method for separating halftone and non-halftone text according to an embodiment of the present invention.
Figure 4:
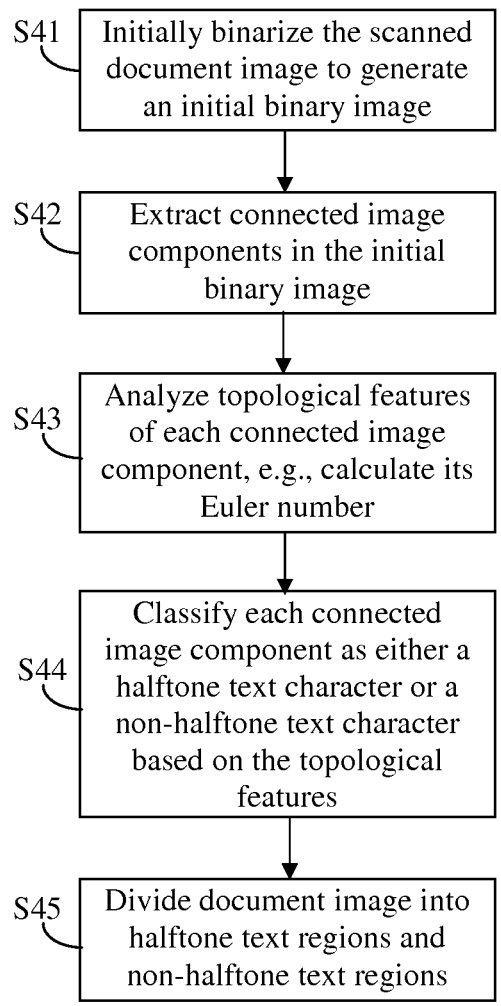

As shown in FIG. 4, this method separates halftone text from non-halftone text based on an analysis of the topological features of the text characters. First, the scanned document image is initially binarized without regard to the presence of halftone text (step S41). This step may use any suitable local or global textual binarization method. Then, connected image components in the initial binary image generated by step S41 are extracted (step S42). In a binary image, a connected image component is a connected group of pixels of the same pixel value (e.g. black). Methods for extracting connected image components are generally known. Each connected image component extracted in this step is potentially a text character. Steps S41 and S42 collectively can be referred to as a step of identifying text characters in the scanned document image.

Then, each connected image component (text character) is classified as either a halftone text character or a non-halftone text character based on an analysis of its topology features (steps S43 and S44). Because of the halftone process, connected image components for halftone text contain many more holes than connected image components for non-halftone text. A hole is an area of white pixels enclosed by black pixels of a connected image component. In a preferred embodiment, this feature is used to classify each connected image component (character). In a particular embodiment, the Euler number is used as a criterion for classifying halftone text characters and non-halftone text characters. The Euler number (an integer) is a measure of the topology of an image. It is defined as $$E=C-H,$$

where E is the Euler number, C is the number of connected image components in the image and H is the number of holes. The Euler number for a text character (e.g. English letters and Arabic numerals) is typically 1, 0 or −1. For example, characters "C", "A" and "8" have Euler numbers of 1, 0 and −1, respectively. Because binarized halftone text typically contains many holes, the Euler number for a halftone text character (including numerals) is generally much smaller than −1. For example, the binarized halftone text character "N" shown in FIG. 4(a) has an Euler number of −43. As such, the Euler number is a good measure for halftone text detection.

In step S43, the Euler number for each detected text character is calculated. In step S44, each connected image component is classified as either a halftone text character or a non-halftone text character based on its Euler number. In one implementation, a connected image component is classified as halftone text character if it has an Euler number below a predefined value, such as −2. Otherwise, it is classified as a non-halftone text character.

Based on the detected halftone text, the document image is divided into non-halftone text areas which are areas containing only non-halftone text and halftone text areas which are areas containing only halftone text (step S45). This may be done, for example, by applying binary morphological operations to the non-halftone text and/or halftone text. Note that if the document contains images or graphics, they are separately treated for authentication which is not described in this disclosure.

Figure 3A:
FIGS. 3(a) and 3(b) illustrate exemplary grayscale images of non-halftone text and halftone text.
Figure 3B:
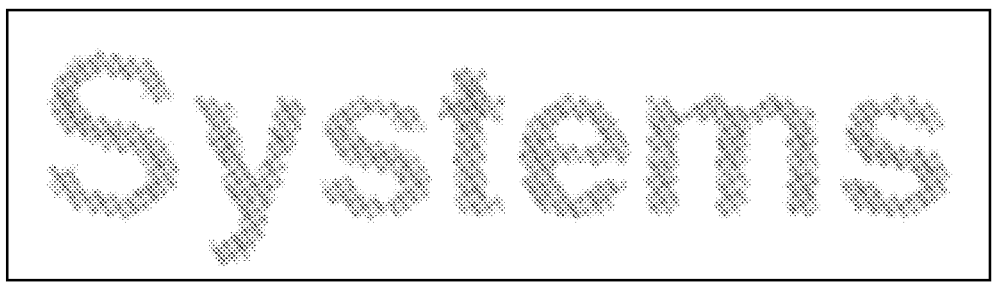
Figure 3C:
FIGS. 3(c) and 3(d) illustrate exemplary binarized images corresponding to the images in FIGS. 3(a) and 3(b).
Figure 3D:

Referring back to FIG. 1, after the non-halftone or dark text and halftone or light text are separated in step S14, the non-halftone or dark text and halftone or light text areas are binarized separately (step S15). For example, pixel value statistics of the non-halftone or dark text and halftone or light text areas can be separately obtained and applied for binarization. Preferably, each halftone or light text area is binarized using pixel value statistics calculated from pixels in that area only. Exemplary images of binarization result corresponding to the images in FIGS. 3(a) and 3(b) are shown in FIGS. 3(c) and 3(d).

Then, for non-halftone or dark text areas, the binarized images are down-sampled, for example, by two times or three times (step S16). In some embodiments, the down-sampling rate may be dynamically determined for different areas of the document. For example, areas of larger sized text, such as titles, headlines, etc., may be down-sampled at a higher rate, such as six times.

In a preferred embodiment, only non-halftone or dark text areas are down-sampled. In other words, the resolution of the halftone or light text areas is maintained. This is because the binarized images of the non-halftone text areas typically have higher quality than the halftone areas, and down-sampling would not adversely affect the quality of the resulting binary images and subsequent authentication performance. On the other hand, as seen by comparing FIGS. 3(c) and 3(d), the binarized images of halftone text (FIG. 3(d)) tend to be less smooth than the binarized images of non-halftone text (FIG. 3(c)), and down-sampling halftone text areas to the same degree as the non-halftone text areas may adversely affect the image quality and subsequent authentication performance. In other embodiments, the halftone or light text areas are also down-sampled, but by a lesser amount than the non-halftone or dark text areas. This may be suitable when the scanned image has a sufficiently high resolution so that even after down-sampling, the binarized halftone text can maintain sufficient quality.

The binarized image of the original document generated as a result of steps S15 and S16 is stored in a storage device (step S17). The image is stored in association with the document management information, such as the document ID, to facilitate image retrieval during the authentication stage.

Note that after the non-halftone or dark text areas are down-sampled, different areas of the binarized image will have different resolutions and the image is no longer a simple M×N binary image. Thus, when storing the binarized image, the various areas may be stored individually as binary images, along with information about their positions.

In step S17, information regarding the down-sampling rates used to down-sample the non-halftone or dark text area (and halftone or light text areas if applicable) is also stored in the storage device along with the binarized image. Other optional information that may be stored in the storage device includes the resolution at which the original document was scanned. Alternatively or in addition, the information mentioned above may be encoded in the barcode which is printed on the copied document.

Optionally, the grayscale image of the scanned original document generated in step S11 can also be stored in the storage device so that the document may be re-printed when desired.

Note that the order of performance of steps S12 and S13 relative to steps S14 to S17 is generally not important. Of course, if the halftone text positions are encoded in the barcode, then steps S12 and S13 should be performed after step S14.

In the document registration stage, steps S14 to S17 may be performed by the copier or printer, in which case the copier can transmit the binarized image to the server or store it directly in the storage device; or they may be performed by the server, in which case the copier will transmit the grayscale image to the server. Step S12 likewise may be performed by either the copier/printer or the server. More generally, the data processing steps S12 and S14 to S17 may be performed in a distributed manner by several devices.

The authentication stage is described with reference to FIG. 2. The target document is scanned to generate a target grayscale image (step S21). The barcode contained in the target image is extracted and decoded to obtain the information contained therein, including the document ID (step S22). The document ID is then used to retrieve the stored binarized image of the original document having the same document ID from the storage device (step S23). Other relevant information stored in the storage device, such as positions of the halftone text, may also be retrieved in this step.

The target grayscale image is processed to separate non-halftone text and halftone text (step S24), and the non-halftone text and halftone text are binarized separately (step S25). Steps S24 and S25 may use generally the same method as steps S14 and S15 in the document registration stage, except that (optionally) if the positions of the halftone text in the original document is available from the storage device or the barcode, they can be used as an initial estimate for the positions of the halftone text in the target grayscale image.

Then, for non-halftone text areas, as well as halftone text areas if appropriate, the binarized images are down-sampled (step S26). The down-sampling rates used for this step are the same as those used to down-sample the binarized image of the original document, which have been retrieved from the storage device and/or decoded from the barcode.

The target binarized image generated by steps S25 and S26 is then compared with the original binarized image retrieved from the storage device to determine if the target document is authentic (i.e. whether it has been altered). Each pair of corresponding text areas in the two images are compared. Of course, if any text area in one image does not have a corresponding text area in the other image, it can be concluded that the target document is not authentic.

The same or different comparison methods may be used to compare the non-halftone text areas of the target image with the original image and to compare the halftone text areas of the target image with the original image. Any suitable image comparison methods may be used. One well-known method for comparing similarity of two images uses normalized cross-correlation. This method is applicable for both halftone and non-halftone text areas of the target image.

Another image comparison method, described in commonly owned U.S. Pat. No. 8,000,528, issued Aug. 16, 2011, involves segmenting the original and target documents into paragraph, line, word and character units, and comparing the two images at progressively lower levers. The paragraph level comparison determines whether the target and original images have the same number of paragraphs and whether the paragraphs have the same sizes and locations; the line level comparison determines if the target and original images have the same number of lines and whether the lines have the same sizes and locations; etc. This method may be applicable for both halftone and non-halftone text areas.

Yet another image comparison method, described in commonly owned U.S. Pat. No. 7,965,894, issued Jun. 21, 2011, involves a two-step comparison. In the first step, the original and target images are divided into connected image components and their centroids are obtained, and the centroids of the image components in the original and target images are compared. Each centroid in the target image that is not in the original image is deemed to represent an addition, and each centroid in the original image that is not in the target image is deemed to represent a deletion. In the second step, sub-images containing the image components corresponding to each pair of matching centroids in the original and target images are compared to detect any alterations. This method may be applicable for both halftone and non-halftone text areas.

Yet another image comparison method, described in commonly owned, co-pending U.S. patent application Ser. No. 13/053,618, filed Mar. 22, 2011, involves comparing pairs of text characters by analyzing and comparing their shape features such as their Euler numbers, aspect ratios of their bounding boxes, pixel densities, the Hausdorff distance between the two characters, etc. For halftone text areas in the target image (even if the corresponding area in the original image contains only light text without halftone effect), this method is likely to be inadequate. Even when the halftone text has been separately binarized, characters may still contain extra holes, so the Euler number of a character may be an inaccurate representation of the character's shape features.

In the authentication stage, steps S24 to S27 may be performed by the scanner, in which case the scanner can request the binarized original image from the server or retrieve it directly from the storage device; or they may be performed by the server, in which case the scanner will transmit the target grayscale image to the server. Step S22 likewise may be performed by either the scanner or the server. More generally, the data processing steps S22 to S23 and S24 to S27 may be performed in a distributed manner by several devices.

Note that the order of performance of steps S22 to S23 relative to steps S24 to S26 is generally not important. Of course, if any stored information is used to aid in binarization, then steps S22 and S23 should be performed before step S24 to S26.

Although not shown in the drawings, various post-processing steps may be carried out, such as generating a difference map between the original image and the target image if any alteration is detected, displaying the detection result to the user, etc. These steps may be implemented using any suitable methods.

An advantage of the document authentication method according to embodiments of the present invention is that, by separating halftone or light and non-halftone or dark text, the two types of text may be treated differently during the document registration stage and authentication stage, so that the non-halftone or dark text may down-sampled to a greater degree than the halftone or light text. This improves speed of the authentication stage without sacrificing reliability.

In the methods shown in FIGS. 1 and 2, the down-sampling of non-halftone or dark areas of the original image is performed during the document registration stage and the resulting image is stored in the storage device. Alternatively, the down-sampling of the original image (step S16) is not performed in the document registration stage, but is performed in the authentication stage. In this alternative approach, the binarized image generated by step S15 is stored in the storage device, along with information regarding the positions of the halftone or light text areas. Then, during the authentication stage, the stored binarized original image retrieved from the storage device, along with the position information, and the image is down-sampled before comparing to the binarized and down-sampled target image. Because down-sampling of the non-halftone or dark areas is not computationally intensive, this alternative embodiment does not significantly impact the performance of the authentication stage.

In the methods shown in FIGS. 1 and 2, the binarization steps of the original image (steps S14 to S16 of FIG. 1) are performed in the document registration stage and the binarized original image is stored in a storage device. An advantage of this approach is that binarization is performed only once for each original document, and the result can be used multiple times later if needed. Another advantage is that the speed of the authentication stage is faster. Alternatively, the original grayscale image may be stored in the storage device without binarizing it, and later when a request for authentication is received, the original grayscale image is binarized and then compared to the binarized target image.

It will be apparent to those skilled in the art that various modification and variations can be made in the document authentication method of the present invention without departing from the spirit or scope of the invention. Thus, it is intended that the present invention cover modifications and variations that come within the scope of the appended claims and their equivalents.

What is claimed is:

1. A document authentication method implemented in a data processing system, comprising:
   (a) obtaining an original grayscale image representing an original document, the original grayscale image including one or more halftone or light text areas and one or more non-halftone or dark text areas;
   (b) separating the halftone or light text areas from the non-halftone or dark text areas in the original grayscale image;
   (c) separately binarizing the halftone or light text areas and the non-halftone or dark text areas generated by step (b);
   (d) down-sampling the binarized non-halftone or dark text areas generated by step (c), which correspond to the non-halftone or dark text areas of the original grayscale image, without down-sampling the binarized halftone or light text areas which correspond to the halftone or light text areas of the same original grayscale image, whereby a binarized original image is generated;
   (e) obtaining a target grayscale image representing a hardcopy target document, the target grayscale image including one or more halftone text areas and one or more non-halftone text areas;
   (f) separating the halftone text areas and the non-halftone text areas in the target grayscale image;
   (g) separately binarizing the halftone text areas and the non-halftone text areas generated by step (f);
   (h) down-sampling the binarized non-halftone text areas generated by step (g), which correspond to the non-halftone text areas of the target grayscale image, without down-sampling the binarized halftone text areas which correspond to the halftone text areas of the same target grayscale image, whereby a binarized target image is generated; and
   (i) comparing the binarized target image with the binarized original image to determine whether the target document is an authentic copy of the original document.

2. The method of claim 1, wherein step (a) includes scanning the hardcopy original document to generate the original grayscale image, and step (e) includes scanning the hardcopy target document to generate the target grayscale image.

3. The method of claim 1, further comprising, after step (a), printing the original grayscale image to generate a copy of the original document.

4. The method of claim 3, further comprising:
   after step (d), storing the binarized original image in a storage device; and
   before step (i), retrieving the stored binarized original image from the storage device.

5. The method of claim 1,
   wherein step (b) includes:
   identifying text characters in the original grayscale image;
   classifying each identified text character as either a halftone text character or a non-halftone text character based on a topological analysis of the text character; and
   dividing the original grayscale image into halftone text areas containing only halftone text characters and non-halftone text areas containing non-halftone text characters;
   where step (c) includes:
   binarizing each halftone text area using pixel value statistics calculated from pixels in that area only;
   wherein step (f) includes:
   identifying text characters in the target grayscale image;
   classifying each identified text character as either a halftone text character or a non-halftone text character based on a topological analysis of the text character; and
   dividing the target grayscale image into halftone text areas containing only halftone text characters and non-halftone text areas containing non-halftone text characters; and
   where step (g) includes:
   binarizing each halftone text area using pixel value statistics calculated from pixels in that area only.

6. The method of claim 1, wherein in steps (d) and (h), two or more binarized non-halftone or dark text areas are down-sampled at different down-sampling rates.

7. The method of claim 1, wherein step (i) includes comparing the non-halftone text areas of the binarized target image and the binarized original image and comparing the halftone text areas of the binarized target image and the binarized original image using different image comparison methods.

8. A computer program product comprising a computer usable non-transitory medium having a computer readable program code embedded therein for controlling a data processing apparatus, the computer readable program code configured to cause the data processing apparatus to execute a document authentication process which comprises:
   (a) obtaining an original grayscale image representing an original document, the original grayscale image including one or more halftone or light text areas and one or more non-halftone or dark text areas;
   (b) separating the halftone or light text areas from the non-halftone or dark text areas in the original grayscale image;
   (c) separately binarizing the halftone or light text areas and the non-halftone or dark text areas generated by step (b); and
   (d) down-sampling the binarized non-halftone or dark text areas generated by step (c), which correspond to the non-halftone or dark text areas of the original grayscale image, without down-sampling the binarized halftone or light text areas which correspond to the halftone or light text areas of the same original grayscale image, whereby a binarized original image is generated.

9. The computer program product of claim 8, wherein the process further comprises:
   (e) obtaining a target grayscale image representing a hardcopy target document, the target grayscale image including one or more halftone text areas and one or more non-halftone text areas;
   (f) separating the halftone text areas and the non-halftone text areas in the target grayscale image;
   (g) separately binarizing the halftone text areas and the non-halftone text areas generated by step (f);
   (h) down-sampling the binarized non-halftone text areas generated by step (g), which correspond to the non-halftone text areas of the target grayscale image, without down-sampling the binarized halftone text areas which correspond to the halftone text areas of the same target grayscale image, whereby a binarized target image is generated; and (i) comparing the binarized target image with the binarized original image to determine whether the target document is an authentic copy of the original document.

10. The computer program product of claim 9, wherein the process further comprises:

after step (d), storing the binarized original image in a storage device; and before step (i), retrieving the stored binarized original image from the storage device.

11. The computer program product of claim 9, wherein step (b) includes:

identifying text characters in the original grayscale image;

classifying each identified text character as either a halftone text character or a non-halftone text character based on a topological analysis of the text character; and dividing the original grayscale image into halftone text areas containing only halftone text characters and non-halftone text areas containing non-halftone text characters;

where step (c) includes:

binarizing each halftone text area using pixel value statistics calculated from pixels in that area only;

wherein step (f) includes:

identifying text characters in the target grayscale image;

classifying each identified text character as either a halftone text character or a non-halftone text character based on a topological analysis of the text character; and dividing the target grayscale image into halftone text areas containing only halftone text characters and non-halftone text areas containing non-halftone text characters; and where step (g) includes:

binarizing each halftone text area using pixel value statistics calculated from pixels in that area only.

12. The computer program product of claim 9, wherein in steps (d) and (h), two or more binarized non-halftone or dark text areas are down-sampled at different down-sampling rates.

13. The computer program product of claim 9, wherein step (i) includes comparing the non-halftone text areas of the binarized target image and the binarized original image and comparing the halftone text areas of the binarized target image and the binarized original image using different image comparison methods.

14. A computer program product comprising a computer usable non-transitory medium having a computer readable program code embedded therein for controlling a data processing apparatus, the computer readable program code configured to cause the data processing apparatus to execute a document authentication process which comprises:

(a) obtaining a target grayscale image representing a hardcopy target document, the target grayscale image including one or more halftone text areas and one or more non-halftone text areas;

(b) separating the halftone text areas and the non-halftone text areas in the target grayscale image;

(c) separately binarizing the halftone text areas and the non-halftone text areas generated by step (b);

(d) down-sampling the binarized non-halftone text areas generated by step (c), which correspond to the non-halftone text areas of the target grayscale image, without down-sampling the binarized halftone text areas which correspond to the halftone text areas of the same target grayscale image, whereby a binarized target image is generated; and (i) comparing the binarized target image with the binarized original image to determine whether the target document is an authentic copy of the original document.

15. The computer program product of claim 14, wherein step (b) includes:

identifying text characters in the original grayscale image;

classifying each identified text character as either a halftone text character or a non-halftone text character based on a topological analysis of the text character; and dividing the original grayscale image into halftone text areas containing only halftone text characters and non-halftone text areas containing non-halftone text characters;

where step (c) includes:

binarizing each halftone text area using pixel value statistics calculated from pixels in that area only.

16. The computer program product of claim 14, wherein step (e) includes comparing the non-halftone text areas of the binarized target image with corresponding areas of the binarized original image and comparing the halftone text areas of the binarized target image with corresponding areas of the binarized original image using different image comparison methods.

* * * * *